United States Patent [19]
Sailer

[11] Patent Number: 5,010,850
[45] Date of Patent: Apr. 30, 1991

[54] SEAT AND HARNESS DEVICE

[76] Inventor: Michael P. Sailer, HCR 70, Box 110, Plymouth, Vt. 05056

[21] Appl. No.: 581,024

[22] Filed: Sep. 12, 1990

[51] Int. Cl.5 .................. A01K 29/00; A62B 35/00
[52] U.S. Cl. .................................... 119/96; 182/3; 182/7; 224/184
[58] Field of Search ............... 119/96, 101; 224/158, 224/160, 184; 182/3, 7; 128/846, 870, 875, 876

[56] References Cited

U.S. PATENT DOCUMENTS

| | | | |
|---|---|---|---|
| 3,038,644 | 6/1962 | Johnson | 119/96 |
| 3,098,479 | 7/1963 | Storey | 119/96 |
| 3,276,431 | 10/1966 | Murcott | 119/96 |
| 4,298,091 | 11/1981 | Anderson | 119/96 |
| 4,396,091 | 8/1983 | Anderson | 182/3 |
| 4,478,311 | 10/1984 | Anderson | 119/96 |
| 4,553,633 | 11/1985 | Armstrong | 182/3 |

Primary Examiner—John G. Weiss
Attorney, Agent, or Firm—Michael J. Weins

[57] ABSTRACT

The present invention relates to a dual purpose device which can be used as a swing type seat and as a harness which can be worn by sportsmen and used to assist the wearer in towing materials.

The harness can also be worn by children. In which case the device can be used to prevent a child from straying from a parent.

The device has a pair of elongated pads which serve as a set for a swing type seat when the device is employed as a seat and as shoulder pads when the device is employed as a harness. The elongated pads are connected to a series of straps and strap segments which complete the sling and the harness configurations.

10 Claims, 5 Drawing Sheets

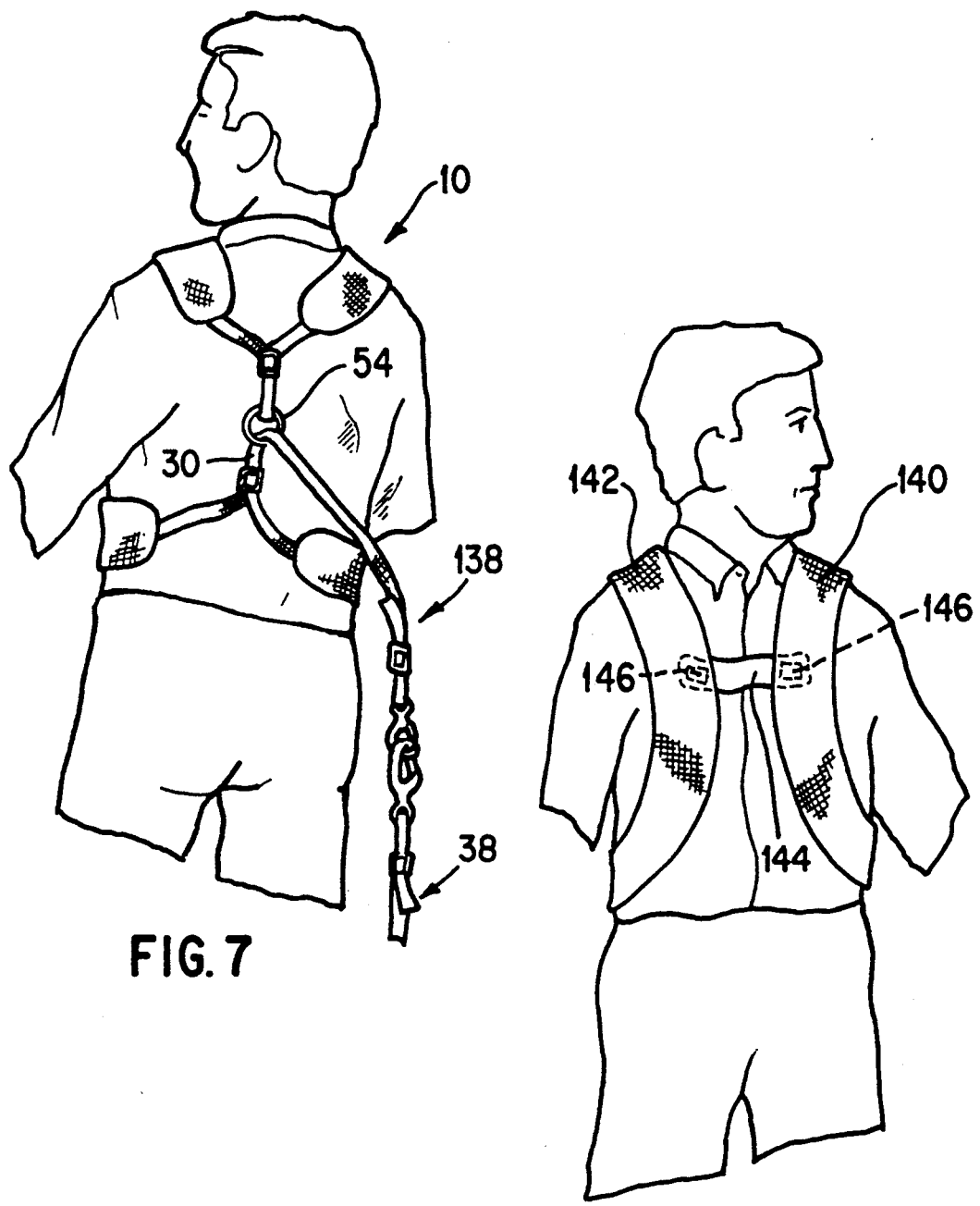

SEAT AND HARNESS DEVICE

FIELD OF INVENTION

The present invention is directed to a dual purpose device which can be used as a swing seat and converts to a harness. The device of the present invention finds applications by a broad class of people ranging from sportsmen to parents.

BACKGROUND ART

Sportsmen and woodsmen frequently have a need for both a seat to rest on while observing the surroundings and a shoulder harness which attaches to a tether to assist in hauling objects such as game, equipment, and other materials.

Similarly parents have need for a child harness which attaches to a tether for preventing the child from straying away from the parent in congested areas and can be converted to a swing for entertaining a child when a harness is not needed.

Folding seats and swings are currently available, however their collapsibility is frequently limited. Likewise harnesses are available which attach to a tether. However, currently if one wishes to avail oneself of both a swing seat and a harness, multiple pieces of paraphernalia must be carried by the sportsman or parent whose limited carrying capacity may already be taxed nearly to its limit.

Thus there is a need for a compact foldable seat which converts to a harness.

SUMMARY OF THE INVENTION

It is an object of the present invention to provide a dual purpose device which can be used as a sling type seat and alternatively as a shoulder harness to aid in towing objects.

It is another object of the present invention to provide a harness for a child, to which a tether can be attached to prevent the child from straying from the parent.

It is an object of the invention to provide a shoulder harness to be worn by a user when towing materials.

It is a further object of the invention to provide a towing device which leaves the user's hands free.

It is an object of the present invention to provide a sling which converts to a harness, which is collapsible, and stores as a compact unit.

It is another object of the present invention to provide a sling which converts to a harness which is lightweight and easy to carry.

It is still another object of the present invention to provide a sling which is sturdy and capable of supporting the weight of a person and a harness which will withstand the tension resulting from towing heavy loads.

These and other objects of the present invention will become apparent from the following figures and description.

The present invention is directed to a dual purpose device which can serve as a sling type swing seat and converts to a shoulder harness having a tether attached thereto.

The device of the present invention in its simplest form has a first elongated pad which has a first end and a second end. A second elongated pad is also provided which has a first end and a second end.

A first strap segment engages the first end of the first elongated pad leaving a first strap segment free end. Straps and segments thereof when referred to in this application will include but not be limited to belts, ropes, cables, chains and cords. A second strap segment engages the second end of the first elongated pad and the second end of the second elongated pad. A third strap segment engages the first end of the second pad and terminates in a third strap segment free end. The first strap segment free end attaches to the third strap segment forming a junction at a point that is substantially equal distant from said first elongated pad and second elongated pad.

A second strap having a second strap first end and a second strap second end is provided. Means for attaching the second strap to the second strap segment are also provided. The means for attaching the second strap to the second strap segment has an opening therein through which the third strap segment can be slidably engaged. Preferably the means for attaching the second strap to the second strap segment would be an attaching ring either attached to the second strap segment or through which the second strap segment passes.

It is preferred that the elongated pads have passages there through which traverse the pads from the first end to the second end. When such passages are provided, the first strap segment, the second strap segment and the third strap segments can be combined to form a continuous pad engaging strap. This continuous strap passes through the passages in the first elongated pad and the second elongated pad, slidably engaging the same. Having a continuous pad engaging strap passing through the first and second elongated pads allows adjustment of the pads position with respect to the junction of the first strap segment and the third strap segment.

It is further preferred that a flexible seat pad be provided which is attachable to the first and second elongated pads.

It is further preferred that the first strap segment free end have a hook attached thereto. The second strap first end and the second strap second end also preferably have hooks attached thereto. These hooks preferably have catches which close the openings in the hooks.

BRIEF DESCRIPTION OF THE FIGURES

FIG. 7 illustrates the embodiment of FIG. 2 being employed as a harness. The view shows the position of the harness with respect to the back of the wearer.

FIG. 8 illustrates the position of the harness of FIG. 6 with respect to the front of the wearer.

BEST MODE OF CARRYING THE INVENTION INTO PRACTICE

Figure 1:
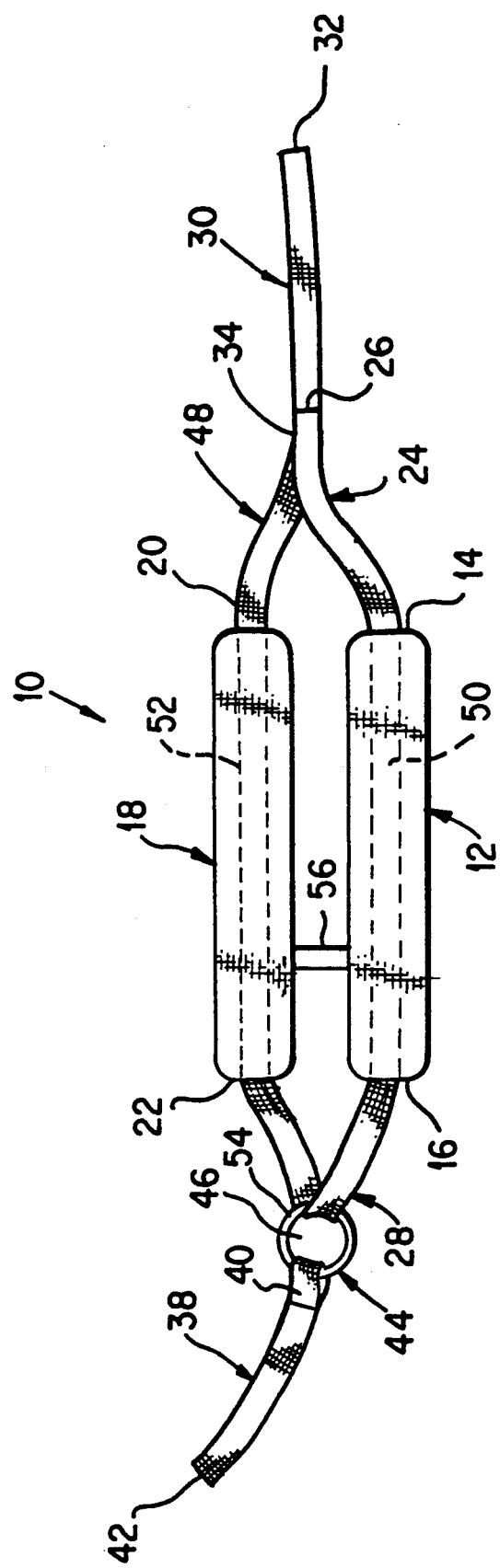
FIG. 1 illustrates one embodiment of the present invention showing the interconnection between the elongated pads and the strap and strap segments of the present invention.

FIG. 1 illustrates one embodiment of the device of the present invention which can be used as a sling or as a harness having a tether attached thereto. The device shall hereinafter be referred to as a sling/harness. As a sling, the device can be used as a swing, and as a harness it can be used for towing. Alternatively the sling/harness can be used as a harness for a child with the tether being used to prevent the child from straying from the parent. The sling/harness 10 as shown in FIG. 1 has a first elongated pad 12 having a first end 14 and a second end 16. A second elongated pad 18 having a first end 20 and a second end 22 is also provided.

A first strap segment 24 engages the first end 14 of the first elongated pad 12 leaving a first strap segment free end 26. A second strap segment 28 engages the second end 16 of the first elongated pad 12 and also the second end 22 of the second elongated pad 18. A third strap segment 30 engages the first end 20 of the second elongated pad 18 and has a third strap segment free end 32.

The first strap segment 24 is attached to the third strap segment 30. The first strap segment free end 26 is attached to the third strap segment forming a junction 34 which is substantially equal distant from the first end 14 of the first elongated pad 12 and the first end 20 of the second elongated pad 18. Thus the junction 34 provides a point substantially equal distant from the first elongated pad 12 and the second elongated pad 18.

A second strap 38 has a second strap first end 40 and a second strap second end 42. Means for attachment 44 of the second strap 38 to the second strap segment 28 are provided. The means for attachment 44 has an opening 46 therein through which the third strap segment 30 can be slidably engaged.

It is preferred that the first strap segment 24, the second strap segment 26, and the third strap segment 28 form a continuous pad engaging strap 48. The continuous pad engaging strap 48 can then be attached to the first elongated pad 12 and the second elongated pad 18.

It is further preferred that the first elongated pad 12 have a first passage 50 there through traversing the first pad 12 from the first end 14 to the second end 16. Similarly, the second elongated pad 18 preferably has a passage 52 traversing the second pad 18 from the first end 20 to the second end 22. The continuous pad engaging strap 48 passes through the passages 50 and 52 and slidably engages the elongated pads 12 and 18.

The preferred means for attaching the second strap 38 to the second strap segment 26 is an attaching ring 54 through which the second strap segment 28 passes.

Preferably a restraining strap 56 attaches the first elongated pad 12 to the second elongated pad 18. The restraining strap 56 limits the separation between the pads 12 and 18 and assures that they remain in close proximity. This restraining strap 56 should preferably be located closer to the second ends 16 and 22 of the pads 12 and 18 to prevent slippage on the shoulders of the wearer when the device is worn as a harness. When the device is employed for a children's harness, the restraining strap 56 also serves as a deterrent to a child slipping out of the harness.

Figure 2:
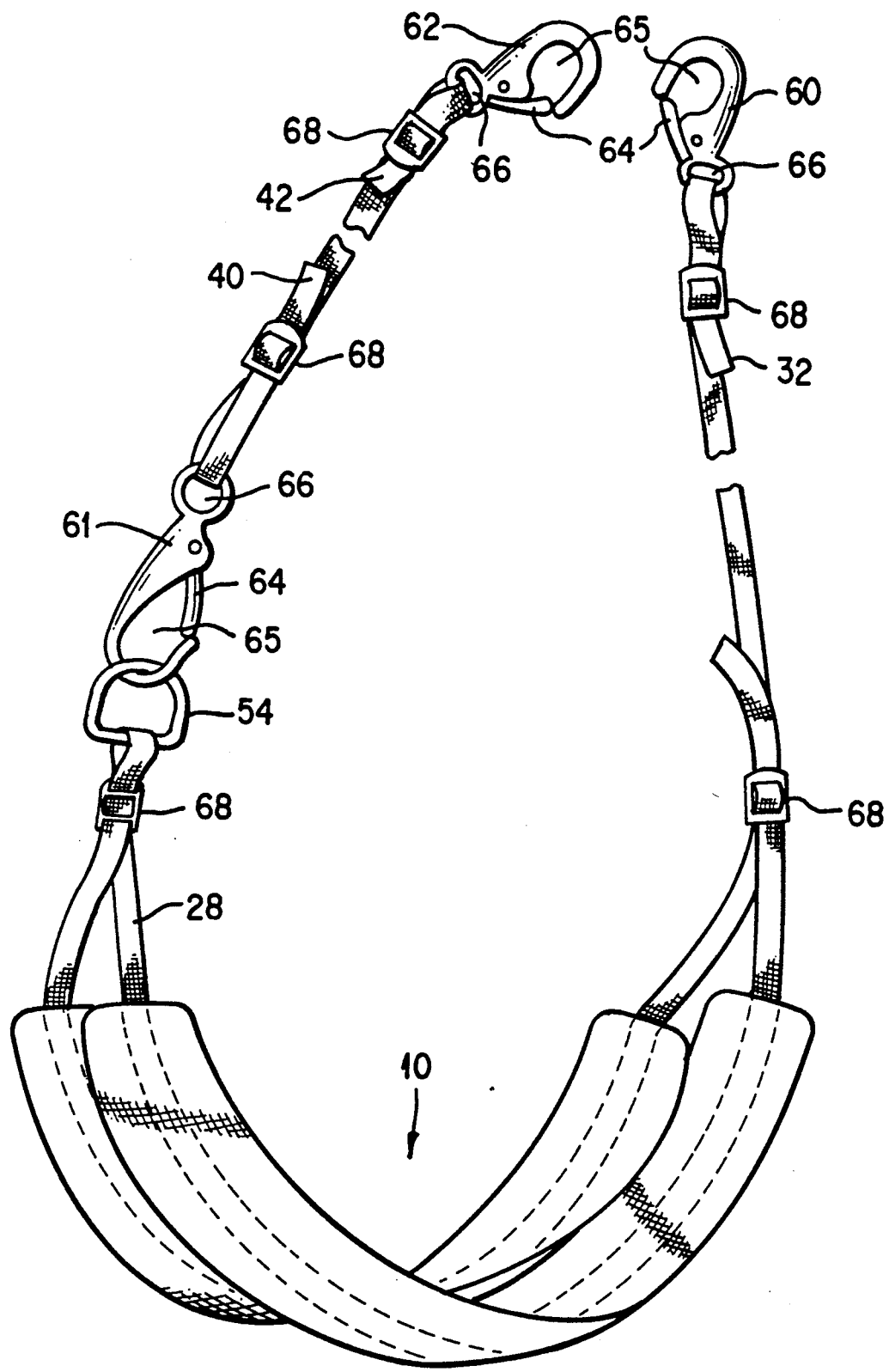
FIG. 2 illustrates a preferred embodiment where the length of the strap and strap segment can be adjusted. The embodiment, as illustrated, is positioned to be used as a swing seat.

FIG. 2 shows a preferred embodiment of the present invention which employs a first hook 60 which attaches to the third strap segment free end 32. A second hook 61 attaches to the second strap first end 40, while a third hook 62 attaches to the second strap second end 42. The hooks 60, 61, and 62 preferably have clasps 64 which close the hook openings 65 once the hook is engaged.

The sling/harness 10 as depicted in FIG. 2 is positioned for use as a seat. The first hook 60 and the third hook 62 can be attached to supports not shown to suspend the sling/harness 10 producing the swing as shown.

Alternatively the straps can be wrapped about a support element such as a limb and the strap passed through the hooks to secure the strap to the support element.

Preferably the hooks 60, 61, and 62 are adjustably connected to straps. The ability to adjust the strap length is provided by passing the strap ends 40, 42, and 32 through passages 66 in the hooks 60, 61, and 62 and then securing the straps by engaging them in the strap adjusters 68.

A strap adjuster 68 is also preferably employed to limit the mobility of the attaching ring 54 on the second strap segment 28. This assures that the attaching ring 54 will remain centered. A strap adjuster 68 is also preferably employed as the fastening means at the junction 34.

Figure 3:
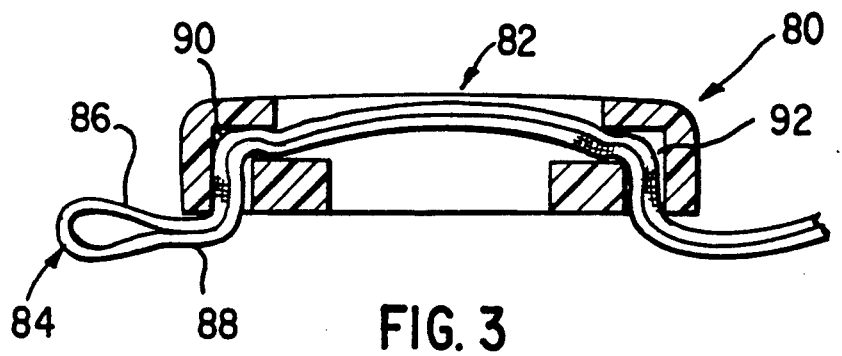
FIG. 3 illustrates a first strap adjuster which can be employed to provide adjustment to the strap length.
Figure 4:
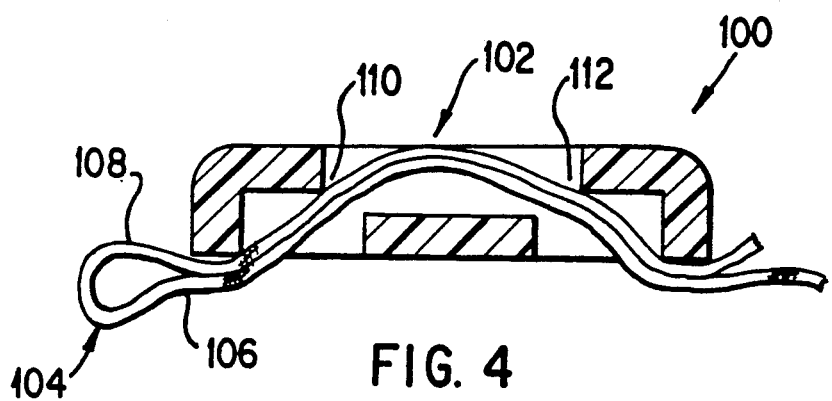
FIG. 4 illustrates a second strap adjuster which can be employed to provide adjustment to the strap length.

There are a variety of commercially available locking mechanisms for webbed straps or belts which can be employed. Two such adjusters are shown in FIGS. 3 and 4. FIG. 3 shows the cross section of an adjuster 80 which has a passage 82 through which the belt 84 is twice passed in a side by side relationship. The upper segment 86 and the lower segment 88 are threaded through "L" shaped channels 90 and 92, the channels 90 and 92 being so sized to assure a positive pressure between the two belt segments 86 and 88 as they pass through the channels 90 and 92. As the belt is pulled taut in the passages 82, a frictional force is developed between the belt segments which prevents the strap segments 86 and 88 from sliding over each other.

FIG. 4 illustrates an alternate adjuster 100. The adjuster 100 has a passage 102 through which a strap 104 is twice passed in a side by side relationship. The upper belt segment 106 and the lower belt segment 108 are threaded through openings 110 and 112 which are sized to provide a slight positive pressure between the two strap segments 106 and 108. As the strap is pulled taut in the passage 102 the frictional force between the strap segments is sufficient to prevent slipping between the strap segments 106 and 108.

Figure 5:
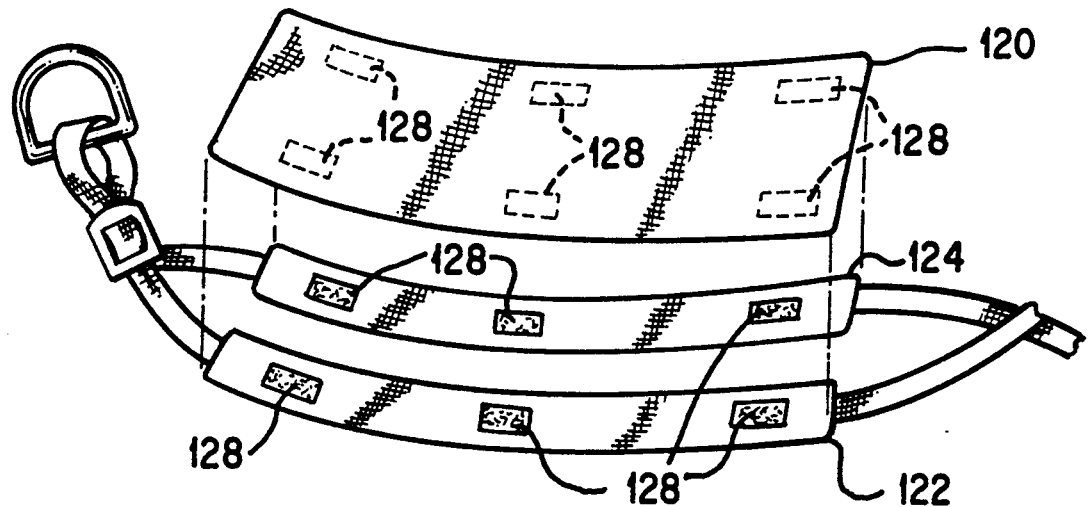
FIG. 5 illustrates another preferred embodiment of the present invention which has a flexible seat pad which can be attached to and detached from the elongated pads.

FIG. 5 shows a preferred seat configuration where a flexible seat pad 120 is provided for attachment to a first elongated pad 122 and a second elongated pad 124. The flexible pad 120 is attached to the elongated pads 122 and 124 with fasteners 128. Hook and pile, snaps, and buttons are examples of such fasteners suitable for use in the present invention. When buttons are used it is preferred that the buttons be attached to the flexible pad 120 so that they will not be present when the flexible pad is removed and the elongated pads 122 and 124 are employed as a harness.

Similarly when snap fasteners are used, it is preferred that the male side of the snap be attached to the flexible seat pad 120 thus avoiding protrusions on the elongated pads which could cause discomfort when the sling/harness is worn as a harness or used as a seat without the flexible pad 120.

Figure 6:
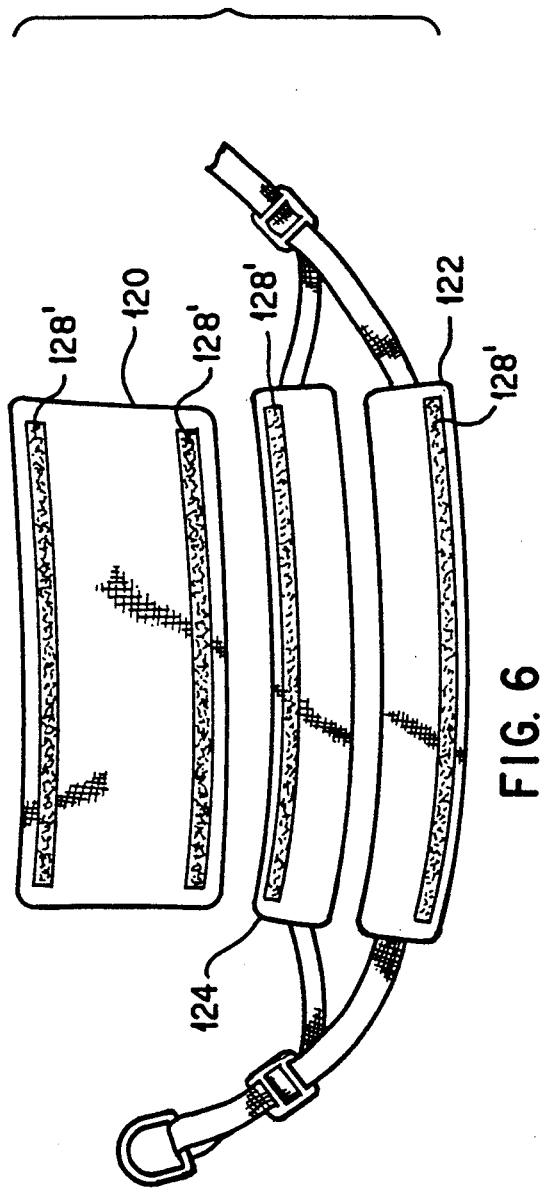
FIG. 6 illustrates another preferred embodiment of the present invention which has hook and pile fasteners attached in continuous strips to the two elongated pads and to the flexible seat pad.

When hook and pile fasteners are employed to provide the fastening means it is preferred that the pile material be attached to the elongated pads 122 and 124 to avoid sticking of the elongated pads to surfaces contacted when the sling/harness is worn as a harness or used as a seat without the flexible pad 120. It is also preferred, when hook and pile fasteners are employed, that the hook and pile fasteners 128' are attached in continuous strips to the two elongated pads 122 and 124 and the seat pad 120, as shown in FIG. 6. Such a configuration for the hook and pile fastener provides an additional gripping surface than is provided by smaller sections 128 placed at intervals along the pads 120, 122, and 124, as illustrated in FIG. 5.

FIG. 7 shows the back view of a person wearing a sling/harness 10. When the sling/harness of FIG. 2 is used for a harness, the second strap 38 shown in FIG. 2 is removed from the attaching ring 54. The third strap segment 30 is passed through the attaching ring 54 providing a tether 138. The length of the tether 138 can be increased by attaching the third strap segment 30 to the second strap 38.

FIG. 8 illustrates the elongated pads 140 and 142 resting on the chest of the wearer. Preferably the restraining strap 144 is employed. The restraining strap 144 can be attached to the elongated pads 140 and 142 with fasteners 146. The section of the fastener attached to the elongated pads 140 and 142 can be the same element used to fasten the flexible pad to the elongated pads. The restraining strap 144 assures that the first elongated pad 140 and the second elongated pad 142 remain in close proximity.

Figure 9:
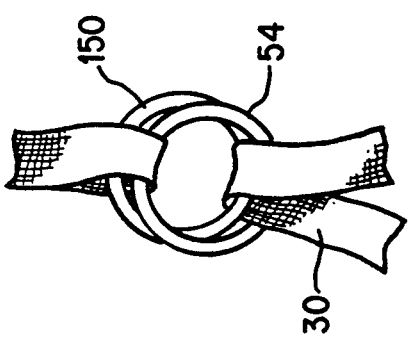
FIG. 9 illustrates an expanded view of a section of FIG. 7 showing a preferred embodiment with an attaching ring and a locking ring.

FIG. 9 is a view of the attaching ring of FIG. 7 being used in combination with a locking ring. In this preferred embodiment an attaching ring 54 as well as a locking ring 150 create a securing means for the third strap segment 30. When the third strap segment 30 is passed over the attaching ring 54 positioned on top, under the locking ring 150 positioned below the attaching ring, and then back through both rings, as shown, a securing means is created by cinching the third strap segment 30 between the rings.

While the present invention has been described in terms of preferred embodiments and particular applications, substitution in detail and design by one skilled in art can be made without departing from the spirit of the invention.

What I claim is:

1. A sling/harness device comprising:
   a first elongated pad having a first end and a second end;
   a second elongated pad having a first end and a second end;
   a first strap segment engaging said first end of said first elongated pad;
   a second strap segment engaging said second end of said first elongated pad and said second end of said second elongated pad;
   a third strap segment engaging said first end of said second elongated pad, said third strap segment having a free end and said first strap segment attaching to said third strap segment forming a junction point, said junction point being substantially equal distant from said first elongated pad and said second elongated pad;
   a second strap having a second strap first end and a second strap second end; and
   means for attaching said second strap to said second strap segment, said means having an opening therein through which said third strap segment can be slidably engaged.

2. The sling/harness device of claim 1 wherein said first strap segment, said second strap segment, and said third strap segment form a continuous pad engaging strap.

3. The sling/harness device of claim 2 wherein said first elongated pad and said second elongated pad have passages there through, said passages passing from said first ends to said second ends of said elongated pads and said pads slidably engage said continuous pad engaging strap.

4. The sling/harness device of claim 3 wherein said means for attaching said second strap is an attaching ring.

5. The sling/harness device of claim 4 further comprising:
   a first hook attached to said free end of said third strap segment;
   a second hook attaching to said second strap first end; and
   a third hook attaching to said second strap second end.

6. The sling/harness device of claim 5 further comprising:
   passages in said hooks through which said strap and strap segments can pass; and
   adjustors for securing said strap and said strap segments to said hooks, said adjustors providing for adjustment of the length of said straps and said strap segments.

7. The sling/harness device of claim 6 wherein said hooks have openings said openings being closable by clasps attached to said hooks.

8. The sling/harness device of claim 7 further comprising:
   a flexible seat pad; and
   fasteners for attaching and removing said flexible seat pad to said first elongated pad and said second elongated pad.

9. The sling/harness device of claim 5 further comprising:
   a restraining strap for securing said first elongated pad to said second elongated pad and limiting the separation between said pads.

10. The sling/harness device of claim 4 further comprising:
    a locking ring, which is positioned in a side by side relationship with said attaching ring.

* * * * *